US011363090B2

(12) United States Patent
Huang

(10) Patent No.: US 11,363,090 B2
(45) Date of Patent: Jun. 14, 2022

(54) INTEGRATING WEB APPLICATIONS WITH LOCAL CLIENT APPLICATIONS IN MULTI-USER CLIENT ENVIRONMENT

(71) Applicant: Citrix Systems, Inc., Ft. Lauderdale, FL (US)

(72) Inventor: Feng Huang, Cambridge (GB)

(73) Assignee: Citrix Systems, Inc., Ft. Lauderdale, FL (US)

( * ) Notice: Subject to any disclaimer, the term of this patent is extended or adjusted under 35 U.S.C. 154(b) by 252 days.

(21) Appl. No.: 16/694,260

(22) Filed: Nov. 25, 2019

(65) Prior Publication Data
US 2021/0160303 A1 May 27, 2021

(51) Int. Cl.
*H04L 67/02* (2022.01)
*H04L 67/01* (2022.01)
*H04L 67/1087* (2022.01)
*H04L 9/40* (2022.01)

(52) U.S. Cl.
CPC ............ *H04L 67/02* (2013.01); *H04L 63/102* (2013.01); *H04L 67/1091* (2013.01); *H04L 67/42* (2013.01)

(58) Field of Classification Search
CPC ....... G06F 21/44; G06F 21/64; H04L 63/102; H04L 67/42; H04L 67/02; H04L 67/1091
See application file for complete search history.

(56) References Cited

U.S. PATENT DOCUMENTS

| 2010/0064006 | A1* | 3/2010 | Chaintreau | G06Q 10/047 709/204 |
| 2010/0082732 | A1* | 4/2010 | Guenther | H04L 67/2823 709/203 |
| 2010/0324999 | A1* | 12/2010 | Conway | G06Q 30/02 705/14.73 |
| 2012/0212227 | A1* | 8/2012 | Candy | G01V 3/15 324/326 |
| 2012/0324365 | A1* | 12/2012 | Momchilov | G06F 3/01 715/738 |
| 2013/0212227 | A1* | 8/2013 | Thomas | H04L 67/02 709/227 |

(Continued)

FOREIGN PATENT DOCUMENTS

IN 201911041286 * 10/2019 ......... G06F 9/44521

*Primary Examiner* — Philip J Chea
*Assistant Examiner* — Mohammed Ahmed
(74) *Attorney, Agent, or Firm* — Finch & Maloney PLLC

(57) ABSTRACT

A computer system is provided. The computer system includes a memory and at least one processor coupled to the memory and configured to load a web application into a browser; generate a random character string; and access a Uniform Resource Identifier (URI) to trigger execution of a protocol handler. The protocol handler is registered with the operating system to handle the URI scheme. The URI includes the random character string. The at least one processor is further configured to cause the protocol handler to start a local client application and provide the random character string to the local client application. The at least one processor is further configured to cause the local client application to start a Hypertext Transfer Protocol (HTTP) listener on a local loopback HTTP endpoint configured for communication between the web application and the local client application. The pathname of the endpoint includes the random character string.

21 Claims, 7 Drawing Sheets

(56) References Cited

U.S. PATENT DOCUMENTS

| | | | | |
|---|---|---|---|---|
| 2013/0318157 A1* | 11/2013 | Harrison | ............... | H04L 67/42 709/203 |
| 2016/0014210 A1* | 1/2016 | Thomas | ............... | H04L 67/12 709/227 |
| 2016/0036927 A1* | 2/2016 | Newburn | ............... | H04L 67/02 709/219 |
| 2016/0350817 A1* | 12/2016 | Garbarino | ............ | G06Q 30/0279 |
| 2017/0142111 A1* | 5/2017 | Ezell | ................ | H04L 63/10 |
| 2017/0195310 A1* | 7/2017 | Tyler | ................ | H04L 63/08 |
| 2018/0345489 A1* | 12/2018 | Allen, IV | ............ | G05B 19/0421 |
| 2019/0303491 A1* | 10/2019 | Chen | ................ | G06F 11/26 |
| 2020/0089860 A1* | 3/2020 | Buddhiraju | ............ | G06F 21/10 |
| 2020/0092333 A1* | 3/2020 | Sebesta | ............... | G06F 9/542 |
| 2020/0137110 A1* | 4/2020 | Tyler | ................ | H04L 63/1483 |
| 2021/0109767 A1* | 4/2021 | Cohen | ................ | G06F 21/44 |
| 2021/0160303 A1* | 5/2021 | Huang | ................ | G06F 21/64 |
| 2021/0263754 A1* | 8/2021 | Cohen | ................ | G06F 9/485 |

* cited by examiner

INTEGRATING WEB APPLICATIONS WITH LOCAL CLIENT APPLICATIONS IN MULTI-USER CLIENT ENVIRONMENT

BACKGROUND

Web-based applications sometimes need to interact with a local client application (e.g., local to the user's computer) to provide a high-quality user experience. For example, in a virtual workspace, users often prefer to start their access via a web browser and then launch virtual applications and/or desktops using a local client application. Traditionally, browser plug-ins have been used to implement the required communications between the web application and the local client application, however, many modern browsers have blocked this approach due to security and stability concerns. Other existing approaches typically use inefficient communication schemes which add latency to the user experience, or do not work in a multi-user client environment.

SUMMARY

In at least one example, a computer system is provided. The computer system includes a memory; and at least one processor coupled to the memory and configured to: load a web application into a browser, in response to a user request; generate, by the web application, a random character string; access, by the web application, a Uniform Resource Identifier (URI) to trigger execution of a protocol handler, the protocol handler registered, with an operating system of the computer system, to handle a scheme of the URI, wherein the URI includes the random character string; start, by the protocol handler, a local client application, the local client application local to the computer system; provide, by the protocol handler, the random character string to the local client application; and start, by the local client application, a Hypertext Transfer Protocol (HTTP) listener on a local loopback HTTP endpoint of the computer system, the local loopback HTTP endpoint configured for communication between the web application and the local client application, wherein the local loopback HTTP endpoint is associated with a pathname, the pathname including the random character string.

At least some examples of the computer system can include one or more of the following features. The at least one processor can be configured to generate, by the web application, a random port number, wherein the URI further includes the random port number; and provide, by the protocol handler, the random port number to the local client application, wherein the local loopback HTTP endpoint is further associated with the random port number. The at least one processor can be configured to terminate the local loopback HTTP endpoint in response to termination of the web application. The at least one processor can be configured to verify, by the local client application, that a domain name associated with a website from which the web application was loaded into the browser is a trusted domain. The at least one processor can be configured to perform the verification further comprising at least one of determining that the domain name is included in a whitelist of trusted domains and obtaining confirmation of trust of the domain name from the user. The at least one processor can be configured to obtain, by the web application, virtual application launch parameters from a remote server; and provide, by the web application, the virtual application launch parameters to the local client application through the local loopback HTTP endpoint. The at least one processor can be configured to communicate, by the local client application, with a remote virtual application host, to launch a virtual application based on the virtual application launch parameters.

In at least one example, a method of integrating a web application with a local client application is provided. The method includes loading, by a computer system, the web application into a browser, in response to a user request; generating, by the web application, a random character string; accessing, by the web application, a Uniform Resource Identifier (URI) to trigger execution of a protocol handler, the protocol handler registered, with an operating system of the computer system, to handle a scheme of the URI, wherein the URI includes the random character string; starting, by the protocol handler, the local client application, the local client application local to the computer system; providing, by the protocol handler, the random character string to the local client application; and starting, by the local client application, a Hypertext Transfer Protocol (HTTP) listener on a local loopback HTTP endpoint of the computer system, the local loopback HTTP endpoint configured for communication between the web application and the local client application, wherein the local loopback HTTP endpoint is associated with a pathname, the pathname including the random character string.

At least some examples of the method can include one or more of the following features. The act of generating, by the web application, a random port number, wherein the URI further includes the random port number; and providing, by the protocol handler, the random port number to the local client application, wherein the local loopback HTTP endpoint is further associated with the random port number. The act of terminating the local loopback HTTP endpoint in response to termination of the web application. The act of verifying, by the local client application, that a domain name associated with a website from which the web application was loaded into the browser is a trusted domain. The act of verifying wherein the verifying further comprises at least one of determining that the domain name is included in a whitelist of trusted domains and obtaining confirmation of trust of the domain name from the user. The act of obtaining, by the web application, virtual application launch parameters from a remote server; and providing, by the web application, the virtual application launch parameters to the local client application through the local loopback HTTP endpoint. The act of communicating, by the local client application, with a remote virtual application host, to launch a virtual application based on the virtual application launch parameters.

In at least one example, a non-transitory computer readable medium storing executable sequences of instructions to integrate a web application with a local client application is provided. The sequences of instructions include instructions to: load a web application into a browser, in response to a user request; generate, by the web application, a random character string; access, by the web application, a Uniform Resource Identifier (URI) to trigger execution of a protocol handler, the protocol handler registered, with an operating system, to handle a scheme of the URI, wherein the URI includes the random character string; start, by the protocol handler, the local client application; provide, by the protocol handler, the random character string to the local client application; and start, by the local client application, a Hypertext Transfer Protocol (HTTP) listener on a local loopback HTTP endpoint, the local loopback HTTP endpoint configured for communication between the web application and the local client application, wherein the local loopback HTTP endpoint is associated with a pathname, the pathname including the random character string.

At least some examples of the non-transitory computer readable medium can include one or more of the following features. Instructions to generate, by the web application, a random port number, wherein the URI further includes the random port number; and provide, by the protocol handler, the random port number to the local client application, wherein the local loopback HTTP endpoint is further associated with the random port number. Instructions to terminate the local loopback HTTP endpoint in response to termination of the web application. Instructions to verify, by the local client application, that a domain name associated with a website from which the web application was loaded into the browser is a trusted domain. Instructions to verify, wherein the verifying further comprises at least one of determining that the domain name is included in a whitelist of trusted domains and obtaining confirmation of trust of the domain name from the user. Instructions to obtain, by the web application, virtual application launch parameters from a remote server; and provide, by the web application, the virtual application launch parameters to the local client application through the local loopback HTTP endpoint. Instructions to communicate, by the local client application, with a remote virtual application host, to launch a virtual application based on the virtual application launch parameters.

Still other aspects, examples, and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
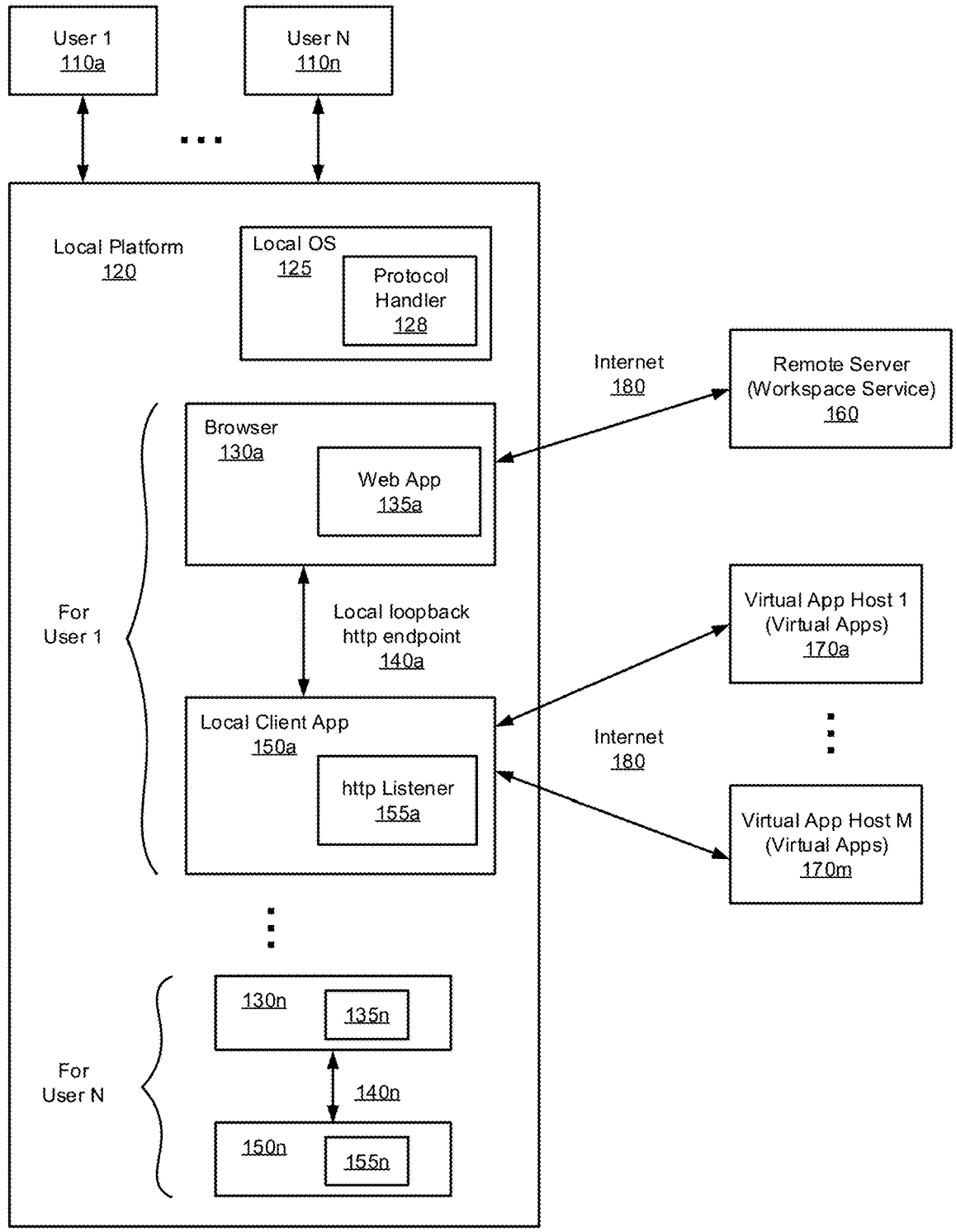
FIG. 1 is a block diagram of a system for integrating a web application with a local client application in a multi-user client environment, in accordance with an example of the present disclosure.

As noted previously, it is sometimes preferable for web-based applications to interact with a client application that is local to the user's computer, in order to provide a high-quality user experience. For example, when using a virtual workspace, users often prefer to start their access via a web browser and then launch virtual applications and/or desktops from a remote host using a local client application which can be designed with greater focus on the particular application and thus provide an improved user interface, compared to what can be achieved through a web browser. Existing techniques for integration of a web browser and a local client application, however, generally fail to provide efficient and secure communication between the web browser on the local client application.

To address these problems, and as summarized above, various examples described herein are directed to systems and methods for integrating web applications with local client applications in a multi-user client environment. The disclosed techniques are based on the use of a custom protocol handler that is registered with the operating system (OS) and configured to start the local client application in response to an access, by the web application, of a specific Uniform Resource Identifier (URI). The URI protocol (e.g., receiver://) is specified as part of a registration process. The URI includes a unique string of characters that are randomly generated by the web application (much like a computer-generated password) to provide an increased level of security, as will be explained in greater detail below. In a multi-user client environment, each user and associated local application are associated with one of the unique and secure URIs. This enables multiple instances of the local client applications to co-exist in an independent and secure manner, such that different user sessions do not interfere with each other.

Additionally, a local loopback Hypertext Transfer Protocol (HTTP) endpoint (e.g., address) is employed for communication between the web application and the local client application, as will also be explained in greater detail below. The local loopback HTTP endpoint uses an Internet Protocol (IP) address in the range of 127.0.0.0 through 127.255.255.255, which is set by the IP standard, and is private to the local computer such that communications on it cannot be seen by the remote servers/hosts or any other entities on the Internet. IP address 127.0.0.1 is most commonly used as a local loopback address and will be referred to herein for that purpose with the understanding that any IP address in the range of 127.0.0.0 through 127.255.255.255 may be employed. Additionally, the lifetime of the local loopback HTTP endpoint is aligned in time with that of the web application session, which further reduces the security attack potential in comparison with permanent local web server approaches employed by some existing solutions.

In some examples, the user may start up a browser and connect to a remote server to access a remote desktop which provides office functionality and tools such as word processing, spreadsheets, and the like. The user experience is improved, however, by launching these tools as virtual applications from the local client application rather than running them in the browser window. The local client application is started by the web browser, in conjunction with the custom protocol handler, and information is communicated from the remote server through the web browser and through the local loopback HTTP endpoint to the local client application. The information may be used by the local client application, to launch the tools as virtual applications from remote virtual application hosts.

As another example, the user may start up a browser and connect to a remote server which is configured to provide music or video on demand. The user experience is improved by employing the local client application to stream audio/video content from remote host systems. Here again, the local client application is started by the web browser, in the manner described above, with communication occurring over the local loopback HTTP endpoint, to provide the information necessary for the local client application to interact with the remote host systems that provide the streaming content. Other applications will be apparent.

In some examples, the domain name of the remote server may be verified against a whitelist of trusted websites as an additional security precaution.

In some further examples, an additional level of security may be provided to detect a compromised browser. This may be accomplished by configuring a trusted remote server to sign the unique random character string using a private encryption key and then requiring the local client application to verify the signature using a corresponding public encryption key of the remote server. This additional protection can be effective because the browser does not have access to the private encryption key of the remote server.

As will be understood in view of this disclosure, the systems and methods for integrating web applications with local client applications in a multi-user client environment provided herein have several advantages over methods which require browser plug-ins, or communication links that are shared between users/clients with the attendant security vulnerabilities. For instance, the systems and methods described herein provide independent communication links (based on unique pathnames that include secure, randomly selected character strings) between web browser and local client application for each user/client. Additionally, those communication links are embodied in a local loopback HTTP endpoint that is private to the local computer.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Application Integration System

In some examples, a system employing a local loopback HTTP endpoint is configured to provide secure communication between a web application with a local client application. The web application 135, which is loaded and executed by the browser 130, can be coded in any suitable language, such as, for example, JavaScript. FIG. 1 is a block diagram of a system 100 for integrating a web application with a local client application in a multi-user client environment, in accordance with an example of the present disclosure. As shown in FIG. 1, the system 100 allows for multiple users 110*a*, . . . , 110*n* to interact with a local platform 120. The local platform 120 includes a local OS 125, and instantiations of a browser 130 and an associated local client application 150 for each user (indicated by subscripts a, . . . , n for each user). Local loopback HTTP endpoints 140*a*, . . . *n* provide secure and direct communication between each user's browser and the associated local client application in a multi-user client environment, as will be described in greater detail below.

A protocol handler 128 is registered with the local OS 125 and is configured to begin execution in response to an access, by a web application 135, of a URI that includes a pre-selected scheme (i.e., the portion of the URI before the first colon) such as "receiver", as in for example, "receiver://". The scheme can be any unique term that does not conflict with a name that is already in use by the OS. During initialization, the protocol handler 128, which may be referred to as a "custom protocol handler" starts up the local client application 150 which includes an http listener 155 that is configured to communicate over the local loopback http endpoint 140, as will be described in greater detail below.

Also, as shown, the web applications 135 interact with a remote server 160 over the Internet 180. The remote server 160 may be configured to provide a workspace service or remote desktop for the user 110. Additionally, the local client applications 150 may interact, over the Internet 180, with one or more virtual application hosts 170, from which virtual applications may be launched.

In some examples, parameters and other information relating to the launch of the virtual applications may be provided from the remote server 160 to the web application 135, and then communicated to the local client application 150 through the local loopback HTTP endpoint 140. Additional information communicated over the local loopback HTTP endpoint 140 may include, for example, confirmation that the local client application 150 is installed correctly (along with version information), an indication of whether or not the local client application 150 is running in a remote session, and feedback on whether or not the launch of the virtual application was successful.

In some examples, the user 110 may start up a browser 130 and connect to the remote server 160 to access a remote desktop which provides office functionality and tools such as word processing, spreadsheets, and the like. The user experience is improved, however, by launching these tools as virtual applications from the local client application 150 rather than running them in the browser window.

In some examples, the user 110 may start up a browser 130 and connect to the remote server 160 which is configured to provide music or video on demand. The user experience is again improved by employing the local client application to stream audio/video content from host systems 170. Other applications will be apparent.

In some additional examples, the disclosed integration techniques may be employed by the browser 130 to store confidential/sensitive information (e.g., an IP connection lease) in secure storage provided by the local platform 120, by communicating that information over the local loopback HTTP endpoint 140 to the local client application 150.

Application Integration Process

Figure 2:
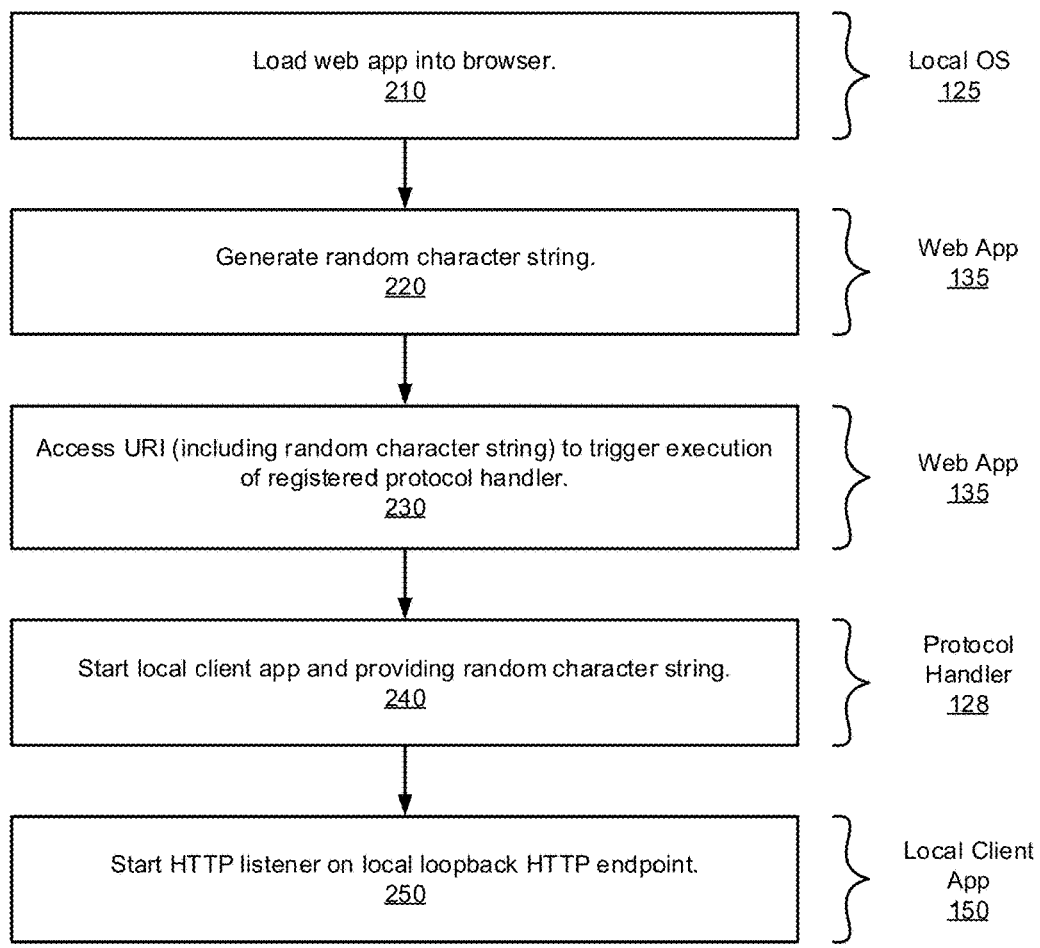
FIG. 2 is a flow diagram of a process for integrating a web application with a local client application in a multi-user client environment, in accordance with an example of the present disclosure.

As described above, some examples of the system 100 of FIG. 1 are configured to perform a process for integrating a web application with a local client application in a multi-user client environment. The processes may be executed on a processor of any suitable type (e.g., processor(s) 710 of FIG. 6). FIG. 2 is a flow diagram 200 of a process for integrating a web application 135 with a local client application 150, of FIG. 1, in a multi-user client environment, in accordance with an example of the present disclosure.

The process 200 starts at operation 210 with the loading of a web application 135 into a browser 130 of FIG. 1, for example in response to a user request.

Next, at operation 220, the web application 135 generates a random and unique character string. That is to say, the character string consists of a random selection of characters, of some predetermined length, that is unique relative to any other character string that has been previously generated on the computer system for this purpose. As such, the length of the character string is typically chosen to be long enough so that the probability of two such randomly generated strings being identical is negligibly small. The length is also chosen to be long enough so that it would be difficult for a hacker or other nefarious party to guess the character string. In some examples, the length may be 32, 64, or 128 characters. In some examples, the random unique character string may be a Globally Unique Identifier (GUID) generated by a call from the web application to the remote server 160 of FIG. 1. For example, an OS call such as NewGuid( ), in Windows™, may be used to generate a GUID.

At operation 230, the web application 135 accesses a URI, which includes the random character string, to trigger execution of protocol handler 128 of FIG. 1. The protocol handler is registered, with the local OS 125 of the computer system 125 of FIG. 1, as a handler for the protocol or scheme of the URI (e.g., "receiver://"). In some examples, the web application 135 also generates a random port number which is included in the URI.

At operation 240, the protocol handler 128 starts the local client application 150 and provides the random character string to the local client application 150. In some examples, where the Web application generates a random port number, this port number is also provided to the local client application by the protocol handler.

Some existing browsers are configured to generate repeated warning prompts to the user in response to each attempt to invoke the protocol handler. This can contribute to an undesirable user experience if the protocol handler is used for launching virtual applications. However, because the custom protocol handler 128 is only invoked once at the beginning of each web session (e.g., when the URI containing "receiver://" is accessed), this problem is avoided.

At operation 250, the local client application 150 starts an HTTP listener 155, on a local loopback HTTP endpoint 140 of the computer system of FIG. 1. The endpoint is based off the IP address 127.0.0.1 (or other loopback IP address) and is configured for communication between the web application 135 and the local client application 150. The endpoint is associated with or designated, at least in part, by a pathname which includes the random character string. In some examples, where the Web application generates a random port number, this port number is also included in the endpoint designation. For example, a local loopback HTTP endpoint may be designated by "http://127.0.0.1:xxx/yyy-yyy/" where xxx is the random port number and yyy-yyy is the random unique character string. The endpoint may include additional fields such as a server name and a request string, as will be described in greater detail below.

In some examples, the local loopback HTTP endpoint 140 is terminated when the web application 135 is terminated (e.g., by closing the socket that was previously opened), as a further precaution to limit the time during which the system may be exposed to security attacks. In some examples, the local client application 150 verifies that the domain name associated with the website, from which the web application was loaded into the browser, is a trusted domain. This may be accomplished by referencing a whitelist of trusted domains or trusted websites, or may be accomplished by obtaining confirmation of trust from the user.

In some examples, the web application 135 obtains virtual application launch parameters from a remote server 160 and provides them to the local client application 150 through the local loopback HTTP endpoint 140. The local client application then communicates with a remote virtual application host 170 of FIG. 1 to launch the virtual application, employing the launch parameters. Launch parameters may include, for example, a server address and gateway for the virtual application host 170, an identifier of the virtual application, and logon information (e.g., credentials, logon ticket, etc.).

Figure 3:
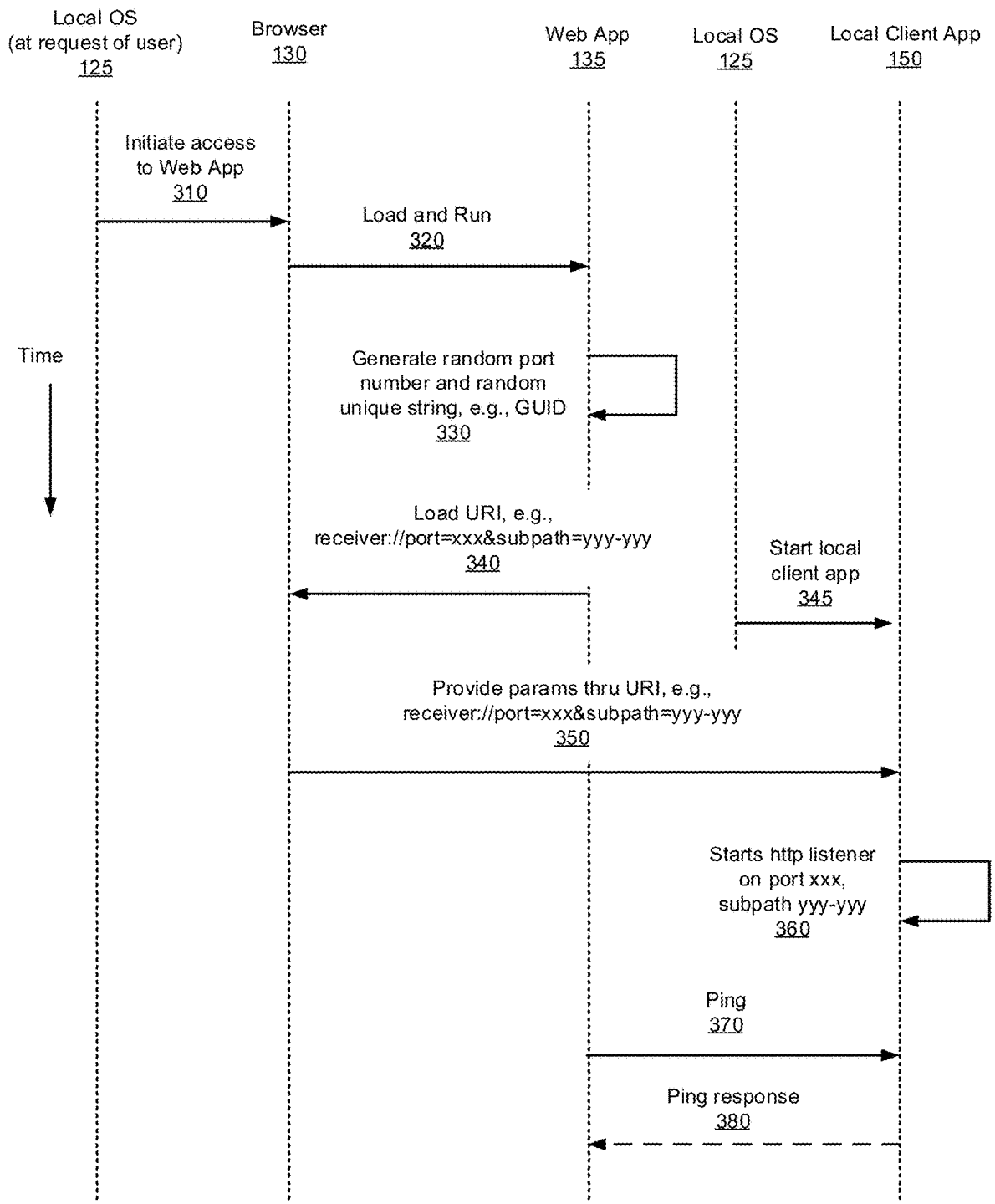
FIG. 3 is a sequence diagram of the process for starting the local client application, in accordance with an example of the present disclosure.

FIG. 3 is a sequence diagram 300 of the process for starting the local client application (or app) 150, in accordance with an example of the present disclosure. The sequence diagram illustrates interactions between entities (the browser 130, web application 135, local OS 125, and local client application 150 of FIG. 1) in the horizontal direction, over time in the vertical direction.

At operation 310, the local OS 125 initiates access to the web application 135 at a specified web site, for example by navigating, in response to input received from the user 110, to the desired website using the browser 130. At operation 320, the browser 130 loads and runs the web application 135.

At operation 330, the web application 135 generates a random unique string, and optionally, a random port number. In some examples, the random unique string may be a GUID.

At operation 340, the web application 135 invokes a URI, formed from the random port number (if generated) and the random unique string, into a hidden frame of the browser 130. An example of such a URI is "receiver://port=xxx&subpath=yyy-yyy" where port xxx is the random port number and subpath yyy-yyy is the random unique string.

At operation 345, the local OS 125 starts the local client application 150. As described previously, the local client application 150 is pre-installed and is started by the protocol handler, which is registered with the local OS 125 as the handler for a custom URI scheme, which in this example is "receiver://".

At operation 350, the web application 135 passes the random port number and random unique string (and any other desired parameters) to the local client application 150 via the URI.

At operation 360, the local client application 150 starts the http listener 155 of FIG. 1 on the local loopback http endpoint (127.0.0.1) using the specified port and subpath, along with any other appropriate information such as, for example, a name of a server and a request string (e.g., http://127.0.0.1/xxx/servername/yyy-yyy/request).

In some examples, as previously mentioned, the random port number may be optional, as multiple HTTP listeners can listen on the same port (e.g., xxx) without conflict, provided that they listen on different subpaths (e.g., yyy-yyy).

At operation 370, the web application 135 polls or pings, the local client application 150, through the loopback HTTP endpoint 140 of FIG. 1, to determine that the local client application is ready. At operation 380, the local client application 150 responds to the ping, through the loopback HTTP endpoint, when it is ready.

Figure 4:
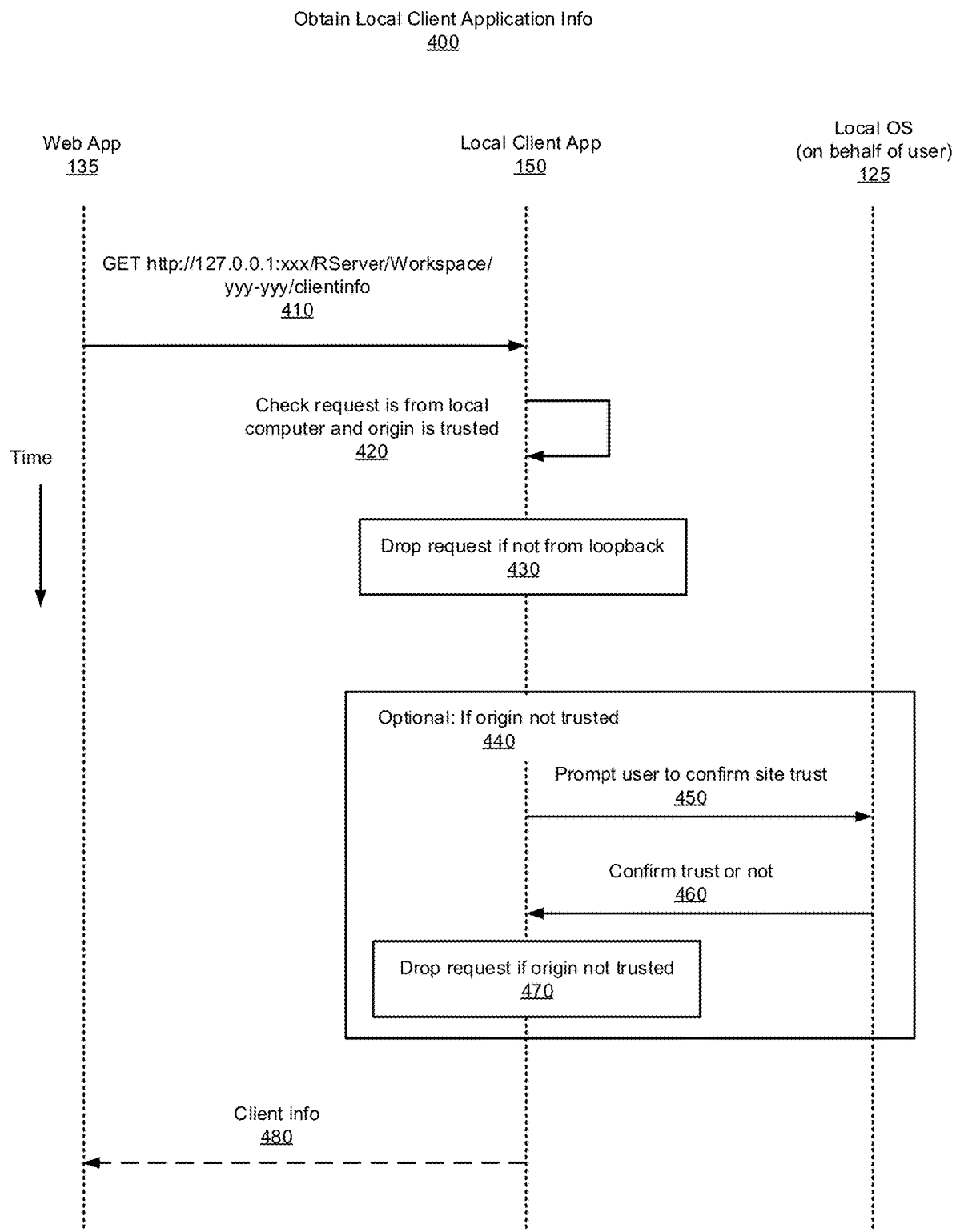
FIG. 4 is a sequence diagram of the process for obtaining local client application information, in accordance with an example of the present disclosure.

FIG. 4 is a sequence diagram 400 of the process for obtaining local client application information, in accordance with an example of the present disclosure. The sequence diagram illustrates interactions between entities (web application 135, local client application 150, and local OS 125, of FIG. 1) in the horizontal direction, over time in the vertical direction.

After the local client application 150 has started, the web application 135 can communicate with the local client application using the loopback http endpoint 140 of FIG. 1. For example, the web application 135 may ask the local client application 150 to provide information about the local client application, send data to the local client application, or instruct the local client application to perform an action. In this example, the local platform 120 interacts with the remote server 160 of FIG. 1 (which is configured to provide a workspace service to the user of the local platform) using the disclosed techniques. The remote server 160 will be designated, for this example, by the string "RServer" and the remote server workspace service will be designated by the string "RServer/Workspace."

At operation 410, the web application 135 makes a request to the local client application 150 for client information, using the loopback http endpoint 140. This may be accomplished, for example, by making an AJAX (Asynchronous Javascript And XML (eXtensible Markup Language)) GET call to http://127.0.0.1:xxx/RServer/Workspace/yyy-yyy/clientinfo, where xxx is the random port number and subpath yyy-yyy is the random unique string as previously described. Examples of client information may include a version number and whether or not the client is running in pass-through mode (e.g., the local application itself is running in a virtual desktop session), although any desired information may be obtained in this manner. AJAX allows web applications to asynchronously send and retrieve data from a server, without interfering with the display or behavior of any existing webpage.

At operation 420, the local client application 150 checks the origin IP address of the GET request, to verify that it is from the local computer (i.e., that it is 127.0.0.1, the loopback http endpoint 140). The local client application 150 also checks that the requesting website is trusted. The browser is in control of the origin header and web applications cannot spoof this header. In some examples, the local client application 150 may check the Windows Internet Options to determine if the website is on the trusted sites list.

At operation 430, the local client application 150 drops the request if it is not from the local computer.

In some examples, operations in group 440 may optionally be performed if the origin website is not trust verified above. In such case, at operation 450, the local client application 150 prompts the user through the local OS 125 to confirm trust in the website. At operation 460, trust is either confirmed or not confirmed. If confirmed, this information may be stored for future use. At operation 470, the local client application 150 drops the request if the origin website is not confirmed by the user as a trusted website.

At operation 480, the local client application 150 sends the requested information back to the web application 135 as an HTTP response.

Figure 5:
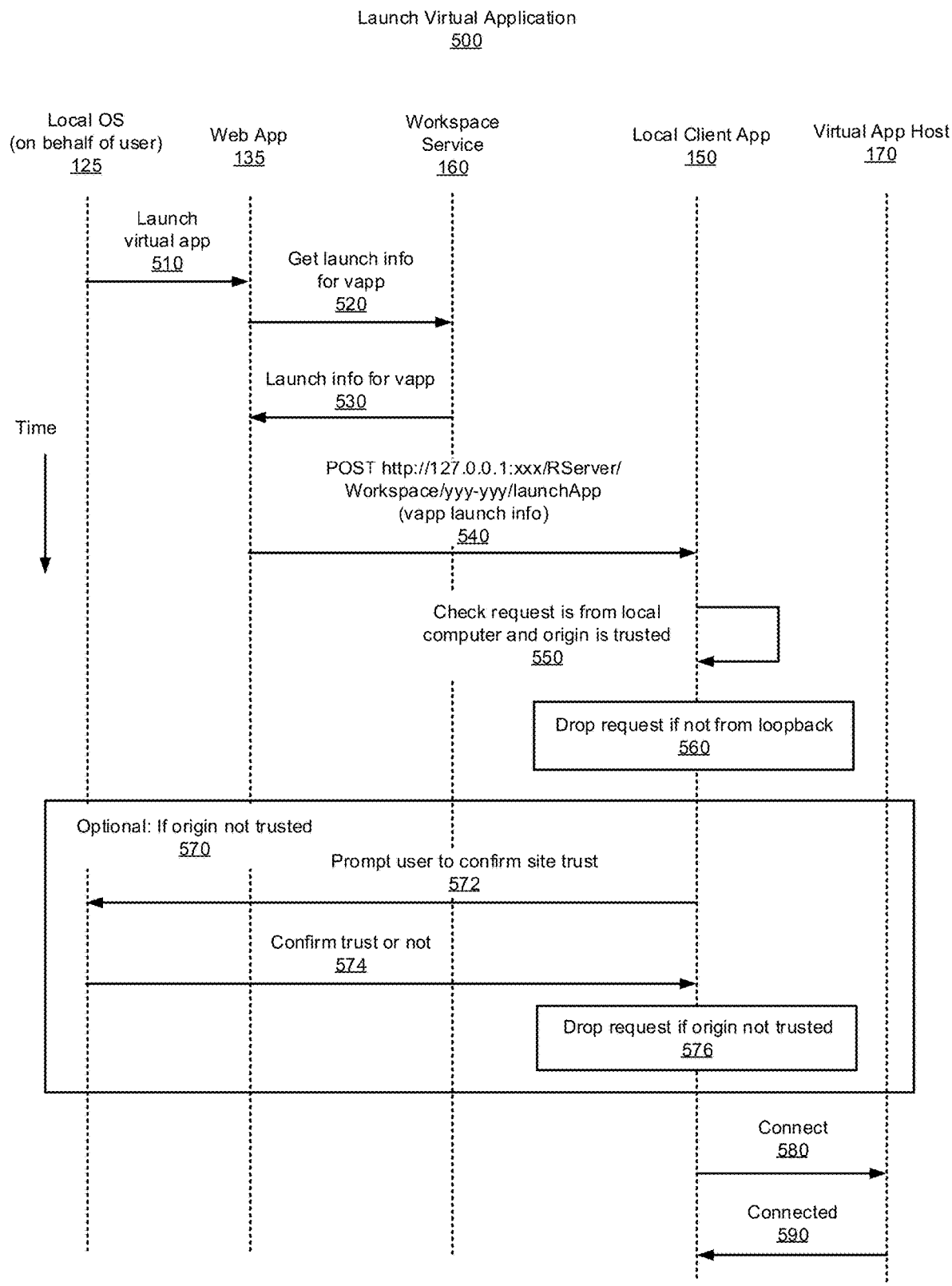
FIG. 5 is a sequence diagram of the process for launching a virtual application, in accordance with an example of the present disclosure.

FIG. 5 is a sequence diagram 500 of the process for launching a virtual application, in accordance with an example of the present disclosure. The sequence diagram illustrates interactions between entities (local OS 125, web application 135, workspace service 160, local client application 150, and virtual application host 170, of FIG. 1) in the horizontal direction, over time in the vertical direction.

At operation 510, the local OS 125 makes a request, on behalf of the user, to launch a virtual application through the web application 135. At operation 520, the web application 135 communicates with the remote server workspace service 160, over the Internet connection 180 of FIG. 1, to request launch information for the virtual application.

At operation 530, the remote server workspace service 160 provides the launch information to the web application 135 over the Internet connection 180. In some examples, the launch information (or parameters) may include one or more of a server address and gateway for the virtual application host 170, an identifier of the application, and logon information (e.g., credentials, logon ticket, or the like).

At operation 540, the web application 135 makes a POST request to the local client application 150 with the launch parameters. An example of the request is: POST http://127.0.0.1:xxx/RServer/Workspace/yyy-yyy/launchApp, where launchApp represents the virtual application launch parameters.

At operation 550, the local client application 150 checks the origin IP address of the POST request, to verify that it is from the local computer (i.e., that it is 127.0.0.1, the loopback http endpoint 140). The local client application 150 also checks that the requesting website is trusted, as previously described for the GET request.

At operation 560, the local client application 150 drops the request if it is not from the local computer.

In some examples, operations in group 570 may optionally be performed if the origin website is not trust verified above. In such case, at operation 572, the local client application 150 prompts the user, through the local OS 125, to confirm trust in the website. At operation 574, trust is either confirmed or not confirmed. If confirmed, this information may be stored for future use. At operation 576, the local client application 150 drops the request if the origin website is not confirmed by the user as a trusted website.

At operation 580, the local client application 150 connects to the virtual application host 170, using the launch parameters. At operation 590, the virtual application host 170 responds to complete the connection.

Figure 6:
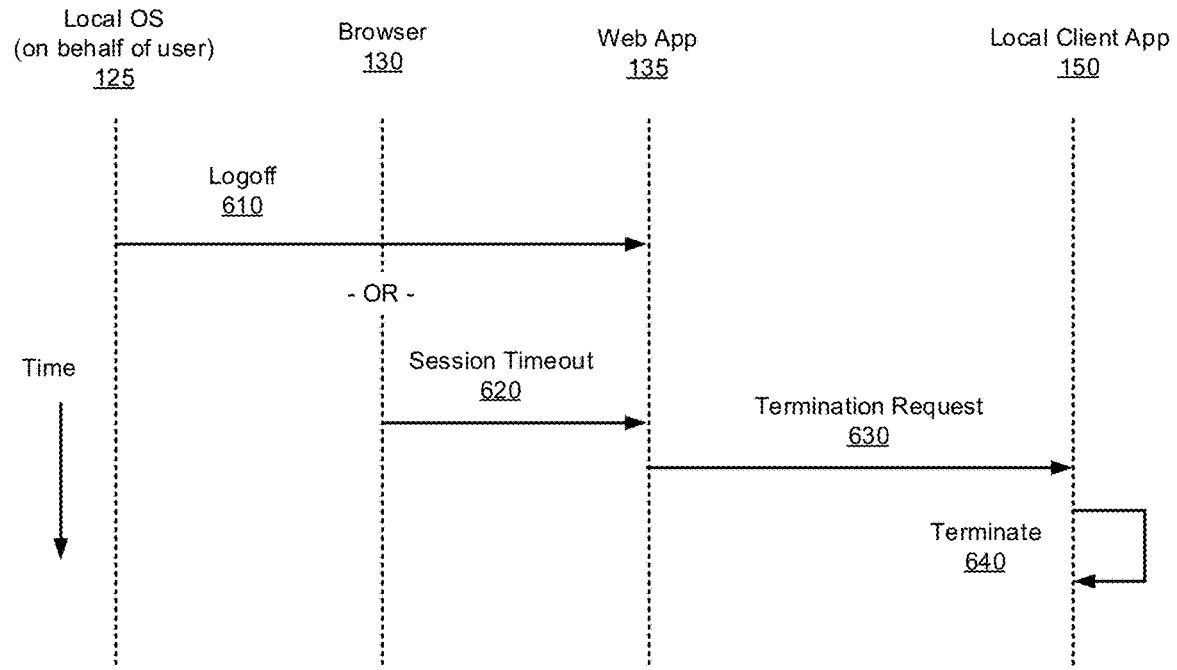
FIG. 6 is a sequence diagram of the process for terminating the local client application, in accordance with an example of the present disclosure.
Figure 6:
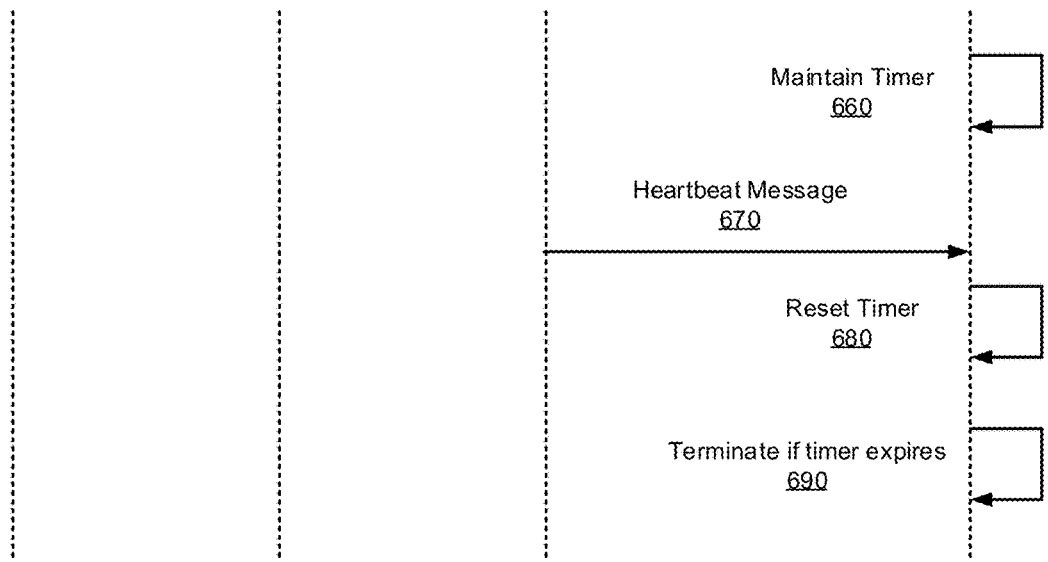

FIG. 6 is a sequence diagram 600 of the process for terminating the local client application, in accordance with an example of the present disclosure. The sequence diagram illustrates interactions between entities (the local OS 125, browser 130, web application 135, and local client application 150, of FIG. 1) in the horizontal direction, over time in the vertical direction.

At operation 610, when the user logs off (through the local OS 125) from the web application 135 (or the session times out, at operation 620), the web application 135 makes a termination request to the local client application 150, at operation 630. This request is performed using the loopback http endpoint 140 of FIG. 1 in the same manner as previously described for the GET and POST requests. At operation 640, in response to receiving a valid termination request, the local client application 150 terminates. An optional trust check may be performed to ensure that the termination request is valid. The trust check would include the operations 550, 560, and 570, as shown in FIG. 5.

The operation of the local client application timer 650 proceeds as follows. At operation 660, the local client application 150 maintains a timer with a selected expiration value. At operation 670, the web application 135 periodically sends a heartbeat message to the local client application 150. At operation 680, in response to the heartbeat message, the local client application resets the timer. At operation 690, the local client application terminates if the timer expires, which occurs if the heartbeat messages are discontinued.

Figure 7:
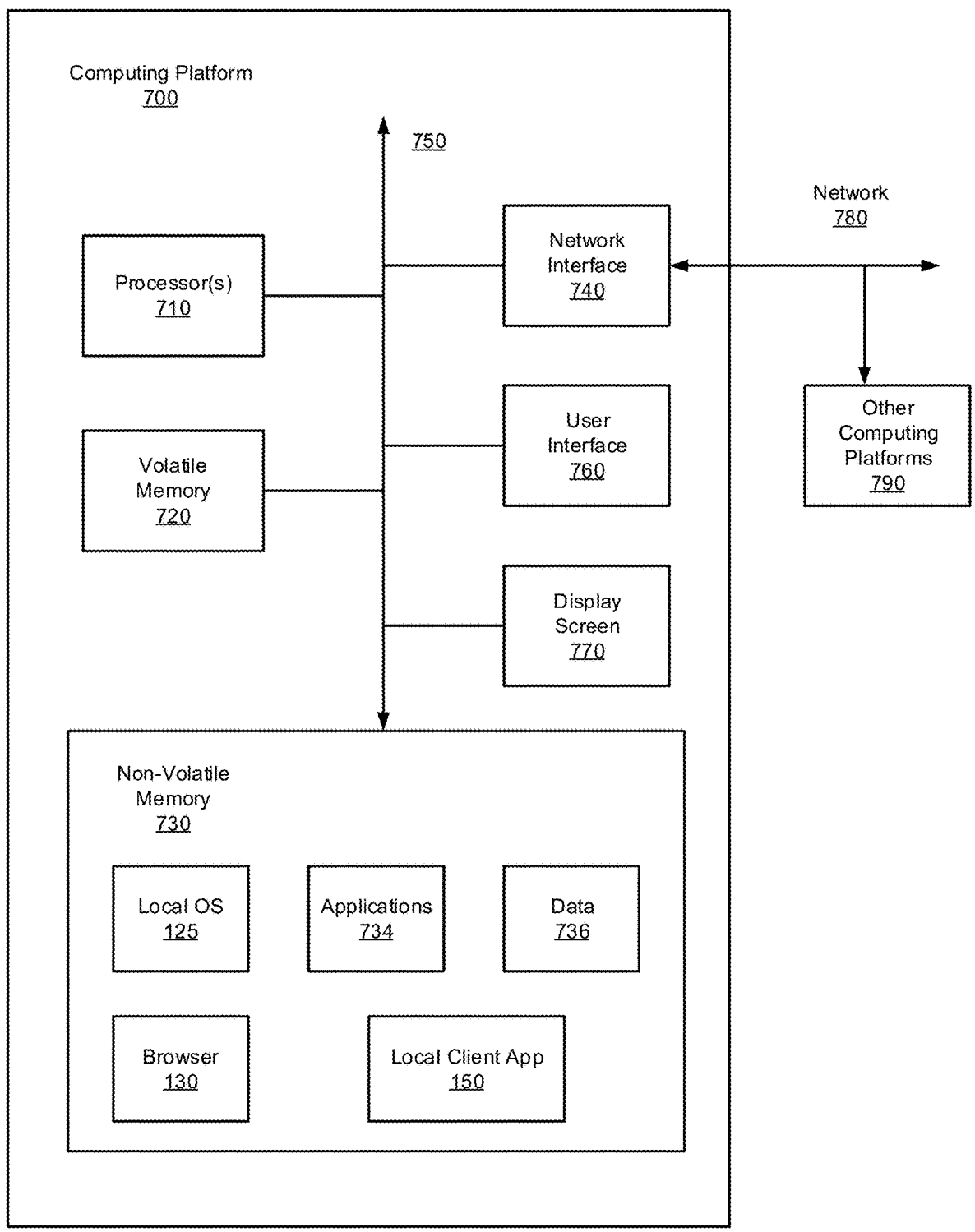
FIG. 7 is a block diagram of a computing platform configured to perform a process for integrating a web application with a local client application in a multi-user client environment, in accordance with an example of the present disclosure.

Computing Platform for Integration of Web Application with Local Client Application FIG. 7 is a block diagram of a computing platform 700 (such as, for example, local platform 120 of FIG. 1) configured to perform a process for integrating a web application with a local client application in a multi-user client environment, in accordance with an example of the present disclosure. In some cases, the platform 700 may be a workstation, a laptop computer, a tablet, a mobile device, or any suitable computing or communication device.

The computing platform or device 700 includes one or more processors 710, volatile memory 720 (e.g., random access memory (RAM)), non-volatile memory 730, one or more network or communication interfaces 740, a user interface (UI) 760, a display screen 770, and a communications bus 750. The computing platform 700 may also be referred to as a computer or a computer system.

The non-volatile (non-transitory) memory 730 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 760 can include one or more input/output (I/O) devices (e.g., a mouse, a keyboard, a microphone, one or more speakers, one or more biometric scanners, one or more environmental sensors, and one or more accelerometers, etc.).

The display screen 770 can provide a graphical user interface (GUI) and in some cases, may be a touchscreen or any other suitable display device.

The non-volatile memory 730 stores an operating system 125 of FIG. 1 (referred to herein as a local OS), one or more applications 734, data 736, a browser 130 of FIG. 1, and local client applications 150 of FIG. 1, such that, for example, computer instructions of the operating system 125, the applications 734, the browser 130, and local client applications 150, are executed by processor(s) 710 out of the volatile memory 720. In some examples, the volatile memory 720 can include one or more types of RAM and/or a cache memory that can offer a faster response time than a main memory. Data can be entered through the user interface 760. Various elements of the computer 700 can communicate via the communications bus 750.

The illustrated computing platform 700 is shown merely as an example client device and can be implemented by any computing or processing environment with any type of machine or set of machines that can have suitable hardware and/or software capable of operating as described herein.

The processor(s) 710 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 710 can be analog, digital or mixed. In some examples, the processor 710 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 740 can include one or more interfaces to enable the computing platform 700 to access a computer network 780 such as a Local Area Network (LAN), a Wide Area Network (WAN), a Personal Area Network (PAN), or the Internet through a variety of wired and/or wireless connections, including cellular connections. In some examples, the network 780 may allow for communication with other computing platforms 790, to enable distributed computing. In some examples, the network 780 may allow for communication with the remote server 160 and the virtual application hosts 170 of FIG. 1.

In described examples, the computing platform 700 can execute an application on behalf of a user of a client device. For example, the computing platform 700 can execute one or more virtual machines managed by a hypervisor. Each virtual machine can provide an execution session within which applications execute on behalf of a user or a client device, such as a hosted desktop session. The computing platform 700 can also execute a terminal services session to provide a hosted desktop environment. The computing platform 700 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

The invention claimed is:

1. A computer system comprising:
a memory; and
at least one processor coupled to the memory and configured to:
load a web application into a browser, in response to a user request;
generate, by the web application, a random character string;
access, by the web application, a Uniform Resource Identifier (URI) to trigger execution of a protocol handler, the protocol handler registered, with an operating system of the computer system, to handle a scheme of the URI, wherein the URI includes the random character string;
start, by the protocol handler, a local client application, the local client application local to the computer system;
provide, by the protocol handler, the random character string to the local client application; and
start, by the local client application, a Hypertext Transfer Protocol (HTTP) listener on a local loopback HTTP endpoint of the computer system, the local loopback HTTP endpoint configured for communication between the web application and the local client application, wherein the local loopback HTTP endpoint is associated with a pathname, the pathname including the random character string.

2. The computer system of claim 1, wherein the at least one processor is further configured to:
generate, by the web application, a random port number, wherein the URI further includes the random port number; and
provide, by the protocol handler, the random port number to the local client application, wherein the local loopback HTTP endpoint is further associated with the random port number.

3. The computer system of claim 1, wherein the at least one processor is further configured to terminate the local loopback HTTP endpoint in response to termination of the web application.

4. The computer system of claim 1, wherein the at least one processor is further configured to verify, by the local client application, that a domain name associated with a website from which the web application was loaded into the browser is a trusted domain.

5. The computer system of claim 4, wherein the verification further comprises at least one of determining that the domain name is included in a whitelist of trusted domains and obtaining confirmation of trust of the domain name from the user.

6. The computer system of claim 1, wherein the at least one processor is further configured to:
obtain, by the web application, virtual application launch parameters from a remote server; and
provide, by the web application, the virtual application launch parameters to the local client application through the local loopback HTTP endpoint.

7. The computer system of claim 6, wherein the at least one processor is further configured to communicate, by the local client application, with a remote virtual application host, to launch a virtual application based on the virtual application launch parameters.

8. A method of integrating a web application with a local client application, the method comprising:
loading, by a computer system, the web application into a browser, in response to a user request;
generating, by the web application, a random character string;
accessing, by the web application, a Uniform Resource Identifier (URI) to trigger execution of a protocol handler, the protocol handler registered, with an operating system of the computer system, to handle a scheme of the URI, wherein the URI includes the random character string;
starting, by the protocol handler, the local client application, the local client application local to the computer system;
providing, by the protocol handler, the random character string to the local client application; and
starting, by the local client application, a Hypertext Transfer Protocol (HTTP) listener on a local loopback HTTP endpoint of the computer system, the local loopback HTTP endpoint configured for communication between the web application and the local client application, wherein the local loopback HTTP endpoint is associated with a pathname, the pathname including the random character string.

9. The method of claim 8, further comprising:
generating, by the web application, a random port number, wherein the URI further includes the random port number; and
providing, by the protocol handler, the random port number to the local client application, wherein the local loopback HTTP endpoint is further associated with the random port number.

10. The method of claim 8, further comprising terminating the local loopback HTTP endpoint in response to termination of the web application.

11. The method of claim 8, further comprising verifying, by the local client application, that a domain name associated with a website from which the web application was loaded into the browser is a trusted domain.

12. The method of claim 11, wherein the verifying further comprises at least one of determining that the domain name is included in a whitelist of trusted domains and obtaining confirmation of trust of the domain name from the user.

13. The method of claim 8, further comprising:
obtaining, by the web application, virtual application launch parameters from a remote server; and
providing, by the web application, the virtual application launch parameters to the local client application through the local loopback HTTP endpoint.

14. The method of claim 13, further comprising communicating, by the local client application, with a remote virtual application host, to launch a virtual application based on the virtual application launch parameters.

15. A non-transitory computer readable medium storing executable sequences of instructions to integrate a web application with a local client application, the sequences of instructions comprising instructions to:
   load a web application into a browser, in response to a user request;
   generate, by the web application, a random character string;
   access, by the web application, a Uniform Resource Identifier (URI) to trigger execution of a protocol handler, the protocol handler registered, with an operating system, to handle a scheme of the URI, wherein the URI includes the random character string;
   start, by the protocol handler, the local client application;
   provide, by the protocol handler, the random character string to the local client application; and
   start, by the local client application, a Hypertext Transfer Protocol (HTTP) listener on a local loopback HTTP endpoint, the local loopback HTTP endpoint configured for communication between the web application and the local client application, wherein the local loopback HTTP endpoint is associated with a pathname, the pathname including the random character string.

16. The computer readable medium of claim 15, wherein the sequences of instructions further include instructions to:
   generate, by the web application, a random port number, wherein the URI further includes the random port number; and
   provide, by the protocol handler, the random port number to the local client application, wherein the local loopback HTTP endpoint is further associated with the random port number.

17. The computer readable medium of claim 15, wherein the sequences of instructions further include instructions to terminate the local loopback HTTP endpoint in response to termination of the web application.

18. The computer readable medium of claim 15, wherein the sequences of instructions further include instructions to verify, by the local client application, that a domain name associated with a website from which the web application was loaded into the browser is a trusted domain.

19. The computer readable medium of claim 18, wherein the verifying further comprises at least one of determining that the domain name is included in a whitelist of trusted domains and obtaining confirmation of trust of the domain name from the user.

20. The computer readable medium of claim 15, wherein the sequences of instructions further include instructions to:
   obtain, by the web application, virtual application launch parameters from a remote server; and
   provide, by the web application, the virtual application launch parameters to the local client application through the local loopback HTTP endpoint.

21. The computer readable medium of claim 20, wherein the sequences of instructions further include instructions to communicate, by the local client application, with a remote virtual application host, to launch a virtual application based on the virtual application launch parameters.

\* \* \* \* \*